United States Patent [19]

Saner

[11] Patent Number: 4,655,306

[45] Date of Patent: Apr. 7, 1987

[54] MASS-MEASURING AND FORCE-MEASURING DEVICE

[75] Inventor: Kaspar Saner, Dübendorf, Switzerland

[73] Assignee: K-Tron Patent AG, Switzerland

[21] Appl. No.: 841,955

[22] Filed: Mar. 20, 1986

[30] Foreign Application Priority Data

Mar. 25, 1985 [EP]  European Pat. Off. ........ 85810126.4

[51] Int. Cl.⁴ ........................... G01G 3/08; G01L 1/22
[52] U.S. Cl. .................................... 177/229; 73/862.65
[58] Field of Search ..................... 177/229; 73/862.65, 73/862.66

[56] References Cited

U.S. PATENT DOCUMENTS

| | | |
|---|---|---|
| 3,423,999 | 1/1969 | Wirth et al. . |
| 4,065,962 | 1/1978 | Shoberg . |
| 4,128,001 | 12/1978 | Marks ............................. 177/229 X |
| 4,143,727 | 3/1979 | Jacobson ...................... 73/862.65 X |
| 4,196,784 | 4/1980 | Suzuki et al. ................ 73/862.65 X |
| 4,338,825 | 7/1982 | Amlani et al .................... 177/229 X |
| 4,485,881 | 12/1984 | Tramposch et al. ............ 177/229 X |
| 4,561,512 | 12/1985 | Tramposch ........................ 177/229 |

FOREIGN PATENT DOCUMENTS

| | | |
|---|---|---|
| 0156931 | 3/1984 | European Pat. Off. . |
| 3242954 | 6/1983 | Fed. Rep. of Germany . |
| 3243350 | 9/1984 | Fed. Rep. of Germany . |
| 2112216 | 6/1972 | France . |
| 2431689 | 2/1980 | France ............................. 177/229 |
| 56-125628 | 2/1981 | Japan . |

Primary Examiner—George H. Miller, Jr.
Attorney, Agent, or Firm—Parkhurst & Oliff

[57] ABSTRACT

A mass-measuring and force-measuring device which comprises a frame, a load-bearing component, means for guiding the load-bearing component at right angles and parallel, and a measuring system, which means consist of two rigid plates connected to one another by means of two horizontal parallel connecting elements arranged one on top of the other, wherein one of these plates is connected to the load-bearing component, and the other plate is connected to the frame, each by means of a swivel joint and a retaining rod.

10 Claims, 7 Drawing Figures

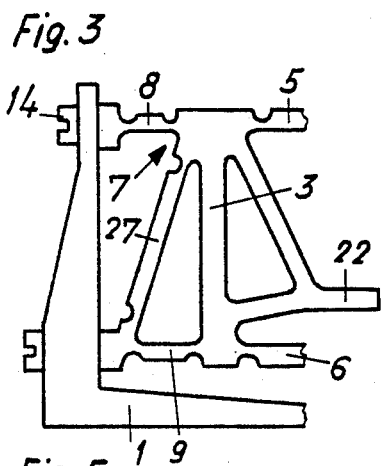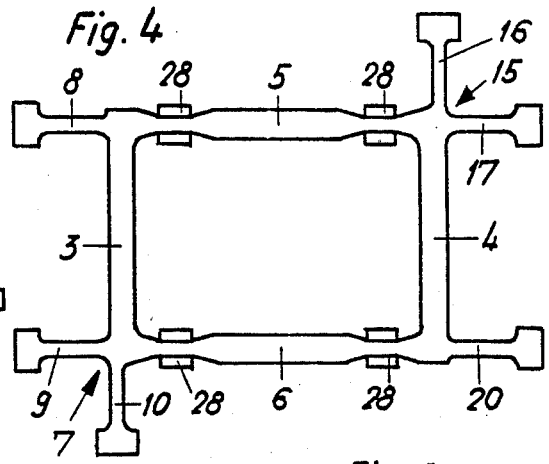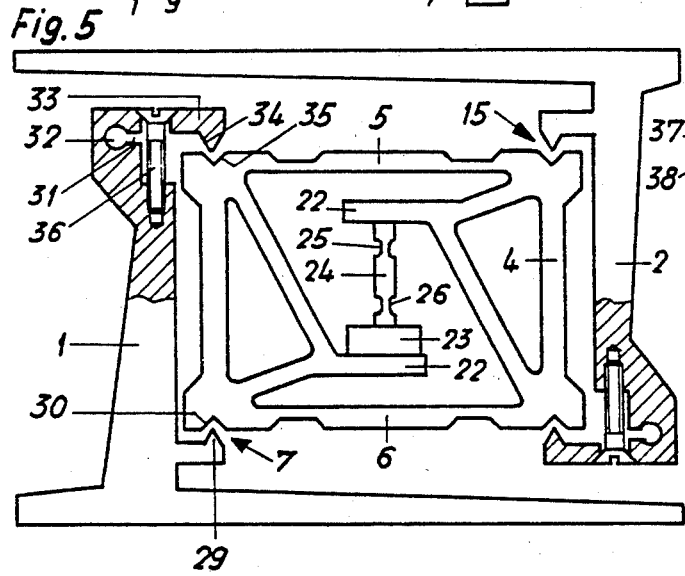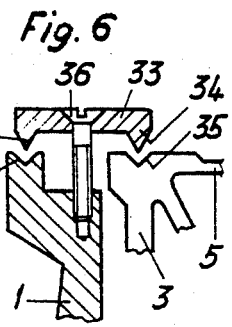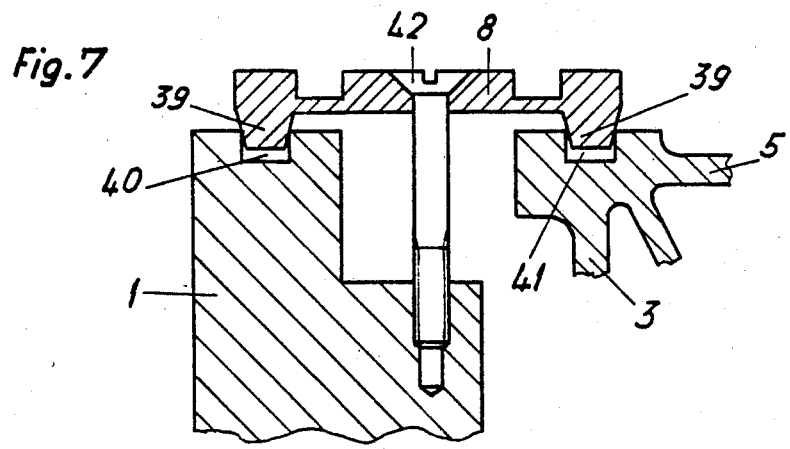

MASS-MEASURING AND FORCE-MEASURING DEVICE

The present invention relates to a mass-measuring and force-measuring device which possesses a frame, a load-bearing component, means for guiding the load-bearing component at right angles and parallel, and a measuring system.

Such devices have been disclosed, for example in U.S. Pat. No. 3,423,999 or in European Offenlegungsschrift No. 0 156 931. It is also known that, in the case of balances, the weight of the balance itself is generally critical with regard to its manufacturing costs and transport cost.

These considerations play a fairly important role particularly with regard to balances having a maximum load of from 30 kg to 300 kg. If the balance is produced with a light-weight construction in the conventional manner, it cannot be sufficiently rigid to prevent deformations of the frame or of the load-bearing component from being transmitted in an unpredictable manner to the measuring system, resulting in measuring errors. If the balance is constructed to be sufficiently heavy to prevent such deformations, it is generally no longer acceptable from an economic point of view.

The object of the invention is to provide a mass-measuring and force-measuring device of an essentially light-weight design, in which undesirable deformations are eliminated in such a way that no troublesome moments and forces are transmitted to the measuring system.

This object is achieved, according to the invention, if these means consist of two rigid plates connected to one another by two horizontal parallel connecting elements arranged one on top of the other, and one of these plates is connected to the load-bearing component and the other plate to the frame, each by means of a swivel joint and a retaining rod.

The attached drawing schematically illustrates examples of the subject of the invention.

FIG. 3 shows a version of FIG. 1, FIG. 4 shows another embodiment of the guide means, FIG. 5 shows a second example, FIG. 6 shows a version of FIG. 5, and FIG. 7 shows a second version.

Figure 1:
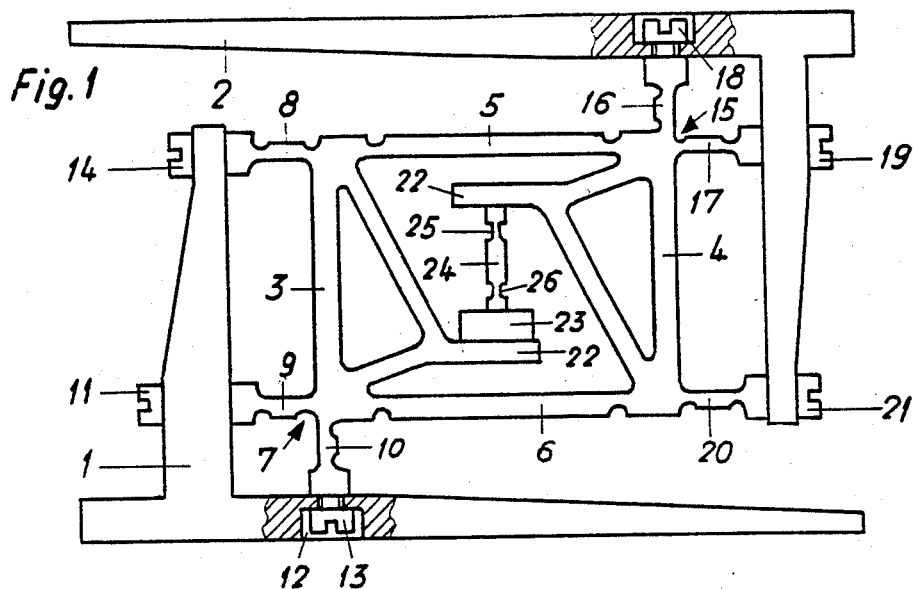
FIG. 1 shows a first example.
Figure 2:
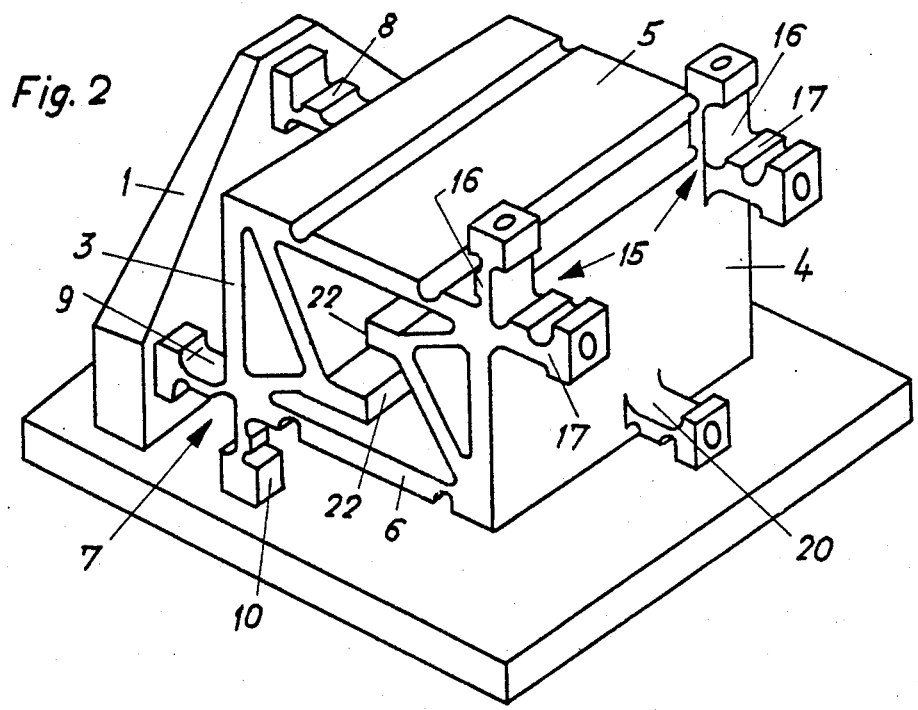
FIG. 2 shows the frame and the means for guiding the load-bearing component, in diagrammatic form.

The device shown in FIG. 1 and 2 is in the form of a mass-measuring apparatus. It possesses a frame 1 and a load-bearing component 2. The means for guiding the load-bearing component 2 at right angles and parallel with respect to the frame 1 consist of two rigid plates 3 and 4 which are at right angles and which are connected to one another by means of two parallel connecting elements 5 and 6 arranged one on top of the other. The parallel connecting elements 5 and 6 are clamped at their two ends in the plates 3 and 4.

The plate 3 is connected to the frame 1 via an axial, two-part swivel joint 7 and a retaining rod 8. The axial swivel joint 7 consists of two connecting rods 9 and 10. The connecting rod 9 is arranged horizontally and is clamped at one end in the plate 3 and at the other end connected firmly to the frame 1 by means of a screw 11. The connecting rod 10 is arranged at right angles, its upper end is clamped in the plate 3 and its lower end is connected firmly to the frame 1 by means of a screw 13 introduced in a recess 12 in the frame 1. The retaining rod 8 is clamped at one end in the plate 3 and at its other end is connected firmly to the frame 1 by means of a screw 14. The plate 4 is fastened in a symmetrical manner to the load-bearing component 2. A two-part swivel joint 15, consisting of two connecting rods 16 and 17, which are firmly connected to the load-bearing component 2 by means of screws 18 and 19, respectively, corresponds to the swivel joint 7. A retaining rod 20, which is fastened by means of a screw 21, corresponds to the retaining rod 8. The connecting rods 16, 17 and 20 are clamped in the plate 4.

FIG. 2 shows the axial swivel joints 7 and 15, each in two coaxial sections, the said swivel joints being mounted at each corner of the plates 3 or 4. It is of course obvious that they may also consist of a single piece which may extend, for example, over at least a part of the length of the edge of the plates 3 and 4.

The plates 3 and 4 each have a bracket 22. A measuring system 23 is fastened on the bracket 22 of the plate 3, and is connected to the bracket 22 of the plate 4 via a stilt 24. The stilt 24 has two narrower parts 25 and 26, each of which forms a resilient joint. If a load is placed on the load-bearing component 2, it executes a virtual vertical movement. The resulting load on the device is transmitted via the stilt 24 to the measuring system 23, which acts as a load sensor.

The stilt 24 may also be replaced with a number of levers. These levers could alternatively be mounted partly on one plate and/or the other plate 3, 4, or on their brackets 22.

The measuring system can consist of, for example, a load cell with a vibrating string or a mass cell with two vibrating strings, and the corresponding electronics with display elements.

In FIG. 3, a variant is shown. In cases where it is desirable for the device to have a very low height, the vertical connecting rod 10 of FIG. 1 can be replaced with an oblique connecting rod 27, the upper end of which is clamped in the plate 3 and the lower end of which is clamped in the frame 1 via the connecting rod 9. Both connecting rods 8 and 27 thus form the axial two-part swivel joint 7.

FIG. 4 shows a version of the embodiment of the guide means. The parallel connecting elements 5 and 6 are solid, so that they themselves act as pressure sensors when the device is subjected to a load. They suffer a S-shaped deformation. The resulting longitudinal elongations are measured by means of strain gages 28, which are connected to electronic evaluation and display means, in a known manner not illustrated.

FIG. 5 shows a second embodiment of the device. The swivel joint 7 at the lower end of the plate 3 consists of a knife edge 29 fastened to the frame 1 and a blade-bearing recess 30 provided at the lower end of the plate 3. The upper end of the frame 1 has a slot 31 with a circular hole 32 at its end, thus forming a horizontal arm 33 of the frame 1; a knife edge 34 which points downward is mounted on the end of the said arm and functions in conjunction with a load-bearing recess 35 of the plate 3. A screw 36 extends through the arm 33. By tightening this screw 36, it is possible to adjust the tension with which the plate 3 is held between the knife edges 29 and 34. The arm 33, the knife edge 34 and the blade-bearing recess 35 together form a retaining rod which corresponds to the retaining rod 8 in FIG. 1. The axes of the hole 32 and of the knife edge 34 are parallel.

It is of course clear that the knife edges 29 and 34 can be mounted on the plate 3, and the blade-bearing recesses 30 and 35 can be mounted on the frame 1. Fastening of the plate 4 to the load-bearing component 2 is identical, as is evident from the drawing, and therefore requires no further description.

FIG. 6 shows a version of the embodiment according to FIG. 5, in which version the arm 33 is provided, at its left-hand end, with a knife edge 37 which functions in conjunction with a blade-bearing recess 38 of the frame 1.

FIG. 7 shows an embodiment which, despite being superficially similar to the embodiments of FIG. 5 and 6, is a version of FIG. 1. The retaining rod has a truncated cone 39 at its two ends. The left-hand truncated cone 39 functions in conjunction with a hole 40 in the frame 1, and the right-hand truncated cone 39 functions in conjunction with the hole 41 in the plate 3. A screw 42 presses the truncated cones 39 into the holes 40 and 41 so that the said truncated cones cannot be rotated or displaced.

In all of the embodiments described, retaining rods and axial swivel joints are designed so that no moments about the axis of rotation of the swivel joints are transmitted either via the retaining rods or via the swivel joints. Such moments would cause undesirable deformation of the parallel connecting elements, which would result in unpredictable errors in the measurement.

As shown in FIG. 2, the guide means, the connecting rods and the swivel joints may consist of a single piece. The entire group can be produced, for example, by cutting from a block or by extrusion of a suitable profile.

I claim:

1. A mass-measuring and force-measuring device comprising a frame (1), a load-bearing component (2), means for guiding the load-bearing component (2) at right angles and parallel, and a measuring system (23 or 28), wherein these means consist of two rigid plates (3, 4) connected to one another by means of two horizontal parallel connecting elements (5, 6) arranged one on top of the other, and one of these plates (4) is connected to the load-bearing component (2) and the other plate (3) is connected to the frame (1), by means of a swivel joint (15 or 7) and a retaining rod (20 or 8; 33, 34, 35; 8, 39) in each case.

2. A mass-measuring and force-measuring device as claimed in claim 1, wherein the swivel joints (7, 15) each consist of a vertical and a horizontal connecting rod (9, 10 or 16, 17).

3. A mass-measuring and force-measuring device as claimed in claim 1, wherein the retaining rods consist of a connecting rod (8) with two truncated cones (39), one truncated cone (39) functioning in conjunction with a cylindrical hole (40) in the frame (1) or in the load-bearing component (2), and the other functioning in conjunction with a cylindrical hole (41) in a plate (3 or 4), and means (42) for adjusting the contact pressure of the truncated cones (39) in the holes (41) are provided.

4. A mass-measuring and force-measuring device as claimed in claim 1, wherein the measuring system (23) serves as a load sensor.

5. A mass-measuring and force-measuring device as claimed in claim 4, wherein the measuring system (23) is fastened to one of these plates (3) and is connected to the other plate (4) via a stilt (24).

6. A mass-measuring and force-measuring device as claimed in claim 1, wherein the parallel connecting elements (5, 6) serve as load sensors.

7. A mass-measuring and force-measuring device as claimed in claim 6, wherein the measuring system (23) consists of strain gages (28) mounted on the parallel connecting elements (5, 6).

8. A mass-measuring and force-measuring device as claimed in claim 1, wherein the swivel joints (7, 15) each consist of a knife edge (29) and a blade-bearing recess (30), and the retaining rods each consists of an arm (33) which possesses a knife edge (34) and is pivotably mounted on the frame (1) or on the load-bearing component (2), and of a blade-bearing recess (35) mounted on one of the plates (3, 4), and means (36) for adjusting the contact pressure of the knife edge (34) in the blade-bearing recess (35) are provided.

9. A mass-measuring and force-measuring device as claimed in claim 8, wherein the arm (33) is mounted on the frame (1) or on the load-bearing component (2) via a resilient bending point (31, 32).

10. A mass-measuring and force-measuring device as claimed in claim 8, wherein the arm (33) is mounted on the frame (1) or on the load-bearing component (2) by means of a knife edge (37) and a blade-bearing recess (38).

* * * * *